United States Patent

Piccirilli et al.

[15] 3,652,943

[45] Mar. 28, 1972

[54] APPARATUS INCLUDING DELAY MEANS FOR DETECTING THE ABSENCE OF INFORMATION IN A STREAM OF BITS

[72] Inventors: Albert T. Piccirilli, Medfield; Frederick P. Cochrane, Needham; Eugene S. Redner, Framingham, all of Mass.

[73] Assignee: Honeywell Inc., Minneoplis, Minn.

[22] Filed: May 4, 1970

[21] Appl. No.: 34,285

[52] U.S. Cl. ..............................328/120, 307/233, 307/234, 328/110, 328/111

[51] Int. Cl. ..........................................................H03k 5/18

[58] Field of Search ..................307/232, 233, 234; 328/109, 328/110, 111, 112, 113, 114, 120

[56] References Cited

UNITED STATES PATENTS

| | | | |
|---|---|---|---|
| 3,072,855 | 1/1963 | Chandler | 328/165 |
| 3,473,230 | 10/1969 | Briggs | 328/111 X |
| 3,405,391 | 10/1968 | Halfhill et al. | 328/109 X |
| 3,071,732 | 1/1963 | Martin et al. | 307/234 X |
| 3,315,168 | 4/1967 | Cantella | 307/234 X |
| 3,518,555 | 6/1970 | Konotchick, Jr. | 328/110 |
| 3,502,995 | 3/1970 | Cottatellucci et al | 328/109 |

*Primary Examiner*—Donald D. Forrer
*Assistant Examiner*—R. C. Woodbridge
*Attorney*—Fred Jacob and Ronald J. Reiling

[57] ABSTRACT

Herein is revealed a missing information bit detector which is utilized in reading either double frequency or phase encoded information. A first circuit receives the information stream of clock and data bits and generates a series of pulses whose width is dependent on the delay of the first circuit, the time between successive bits and the duration of such bits received at its input. A low pass digital filter is coupled to receive such pulses and generates an output signal indicative of a missing bit when the width of such pulses in greater than a specified value. Also revealed is a means for separating the clock and data bits while maintaining a selected phase relationship therebetween.

20 Claims, 4 Drawing Figures

ALBERT T. PICCIRILLI
FREDERICK P. COCHRANE
EUGENE S. REDNER
INVENTORS

BY John S. Solakian
ATTORNEY

ALBERT T. PICCIRILLI
FREDERICK P. COCHRANE
EUGENE S. REDNER
INVENTORS

BY John S. Solakian
ATTORNEY

APPARATUS INCLUDING DELAY MEANS FOR DETECTING THE ABSENCE OF INFORMATION IN A STREAM OF BITS

BACKGROUND OF THE INVENTION

A. Field of the Invention

The present invention relates to magnetic recording and more particularly to means for detecting missing data or clock bits recorded with a double frequency or phase encoding technique respectively.

B. Description of the Prior Art

Numerous techniques have been developed for representing and recording binary information on a magnetic medium. This factor is particularly true as data processing speeds have increased and the need for higher density magnetic recording has correspondingly increased. One of such techniques is generally referred to as double transition recording which includes phase encoding and double frequency encoding. In double frequency encoding, clock bits and data bits alternate in a stream of information bits. The presence of a data bit is representative of a first binary number whereas the absence of a data bit is representative of a second binary number. The clock bits are usually present. In phase encoding, the polarity of each recorded transition is representative of the bits stored in a given data cell, an additional transition being required between each pair of like bits. The absence of a clock bit is indicative of a change in the binary number of the succeeding data bits.

To facilitate read out of the clock and data bits it is desirable to achieve maximum separation between bits, that is, one half of a period. The period includes both a clock cell at the beginning thereof and a data cell. However, in such high density recording systems severe shifting of the recorded clock and data bits occurs due to magnetic crowding, mechanical jitter, and effects produced by the electric circuits in the process of recording and sensing the data. This shifting of the recorded bits displaces the clock and data bits in their nominal positions in the stream of information bits and can result in erroneous decoding, that is, can result in erroneous generation of the data or clock bits or in the failure to respond to a data bit.

Numerous apparatus exists in the prior art for detecting information which is recorded by the double transition technique. One such prior art device utilizes a circuit for generating a constant phase reference signal synchronized at the same frequency as the signal waveform representing the data. The data and reference signals are combined to produce a signal for sampling the significant transitions over the entire nominal bit period. Another such prior art device utilizes a scheme in which a fixed time period is established for sampling for the presence of a significant transition, wherein a ramp generator may be utilized to determine the time period. Another known prior technique utilizes a frequency tracking phase lock oscillator during read out. Continually synchronized by the read out pulses this so called fly wheel oscillator is used as a timing reference in lieu of the read out pulses themselves which are subject to instantaneous timing fluctuations. These and other prior art devices which are utilized for detecting information recorded by the double transition technique include limitations either singly or in combination such as, their accuracy is limited to the accuracy of the time constant of a timing device therein such as an oscillator or ramp generator. In addition, some such prior art devices are limited in capability for accommodating large shifts in the clock and data bits. Also, some of these prior art devices cannot be easily adapted to accommodate a change in rate of the received stream of information bits. Such prior art devices also tend to use critical components and are complex and expensive in manufacture and critical in electrical alignment.

It is therefore an object of the present invention to provide an improved information detecting apparatus.

It is another object of the invention to provide simplified, yet accurate means for detecting the absence of a clock or data bit in a stream of information bits.

It is a further object of the invention to provide apparatus for information detecting which is inexpensive and which separates data bits and clock bits while maintaining a fixed phase relationship therebetween.

SUMMARY OF THE INVENTION

The purposes and objects of the invention are satisfied by providing information detecting apparatus which is coupled to receive a stream of information bits which include alternate data bits and clock bits. Such apparatus includes a first delay means having a first delay time for delaying the stream of information bits. The stream of information bits and delayed stream of information bits are coupled to a pulse generating means which generates a stream of pulses, the width of each of such pulses being dependent on the first delay time and the time between successive ones of the clock and data bits. The stream of pulses is coupled to the input of a low pass digital filter which produces an output signal representative of a missing one of the bits in the stream of information bits when the width of any one of such pulses is greater than a preselected value. Such filter includes a second delay means having a second delay time for delaying the stream of pulses and gate means coupled to receive both the stream of pulses and the delayed stream of pulses so as to produce the output signal which is indicative of the missing bit. In double frequency encoding, the output signal will be representative of a missing data bit, whereas in phase encoded recording the output signal will be representative of a missing clock bit.

BRIEF DESCRIPTION OF THE DRAWINGS

The advantages of the foregoing configuration of the present invention will become more apparent upon reading the accompanying detailed description in conjunction with the Figures in which.

DETAILED DESCRIPTION OF THE PREFERRED EMBODIMENTS

Figure 1:
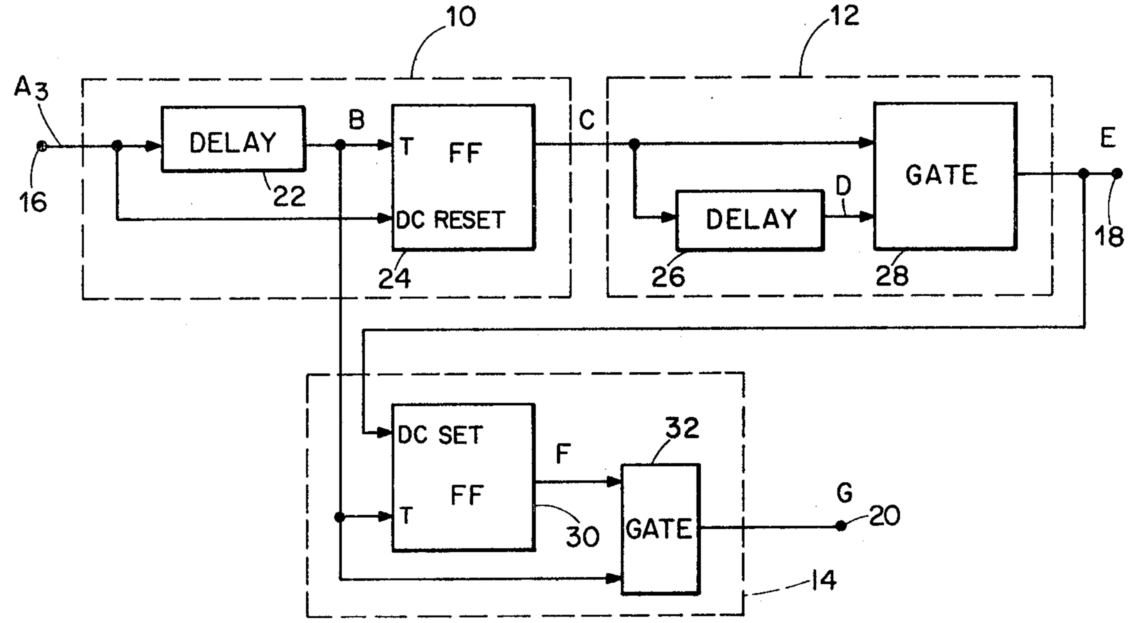
FIG. 1 is a schematic block diagram illustrating the information detecting apparatus as utilized with double frequency encoded recording.

In FIG. 1, the information detecting apparatus of the invention includes a missing information bit detector having a first circuit 10 and a second circuit 12 coupled between input terminal 16 and output terminal 18. Also included is a clock bit separator 14 which is coupled between the missing bit detector arrangement and a second output terminal 20. Circuit 10 is utilized to generate a stream of pulses, the width of which is dependent upon the delay of circuit 10, the time between successive bits and the duration of such bits received at terminal 16. Circuit 12 is a low pass digital filter which produces an output signal when the width of the pulses from circuit 10 are greater than a predetermined value.

Circuit 10 includes a delay 22 and a flip-flop 24. Flip-flop 24 preferably includes a toggle input (T) and an override or DC Reset input. The output of delay 22 is connected to the toggle input whereas input terminal 16 is connected to the DC Reset input. Circuit 12 includes a delay 26 and a gate 28. Delay 26 is of the same type as delay 22 and both delay means may be of the lumped constant delay line type, however, any circuit producing a delay for pulses applied thereto could have been used. Such delay circuits could have included a monostable multivibrator or a clocked bistable multivibrator, etc. Gate 28 by way of example produces a negative output pulse for positive levels applied simultaneously to its inputs. One input to gate 28 is received from the output of circuit 10 whereas the other input to gate 28 is received from the output of delay 26, which receives as its input the output of circuit 10. Delays 22 and 26 may be alterable (such as a tapped delay line) to adapt to different rates of the stream of information bits received in terminal 16.

Clock bit separator circuit 14 includes a flip-flop 30 and a gate 32 which by way of example produces a positive output pulse for simultaneous inputs thereto. Both flip-flops 24 and 30 may be of the well known J-K type such as that which is particularly designated as J-K master-slave flip-flop which can be purchased from Texas Instruments, Inc. under part number SN 7472. Such J-K flip-flops are adapted to respond to transitions from a positive to negative state. The DC Set override input of flip-flop 30 is connected to the output of circuit 12, whereas the toggle input of one input to gate 32 is connected to receive the output of delay 22. The other input to gate 32 is received from flip-flop 30.

Figure 3:
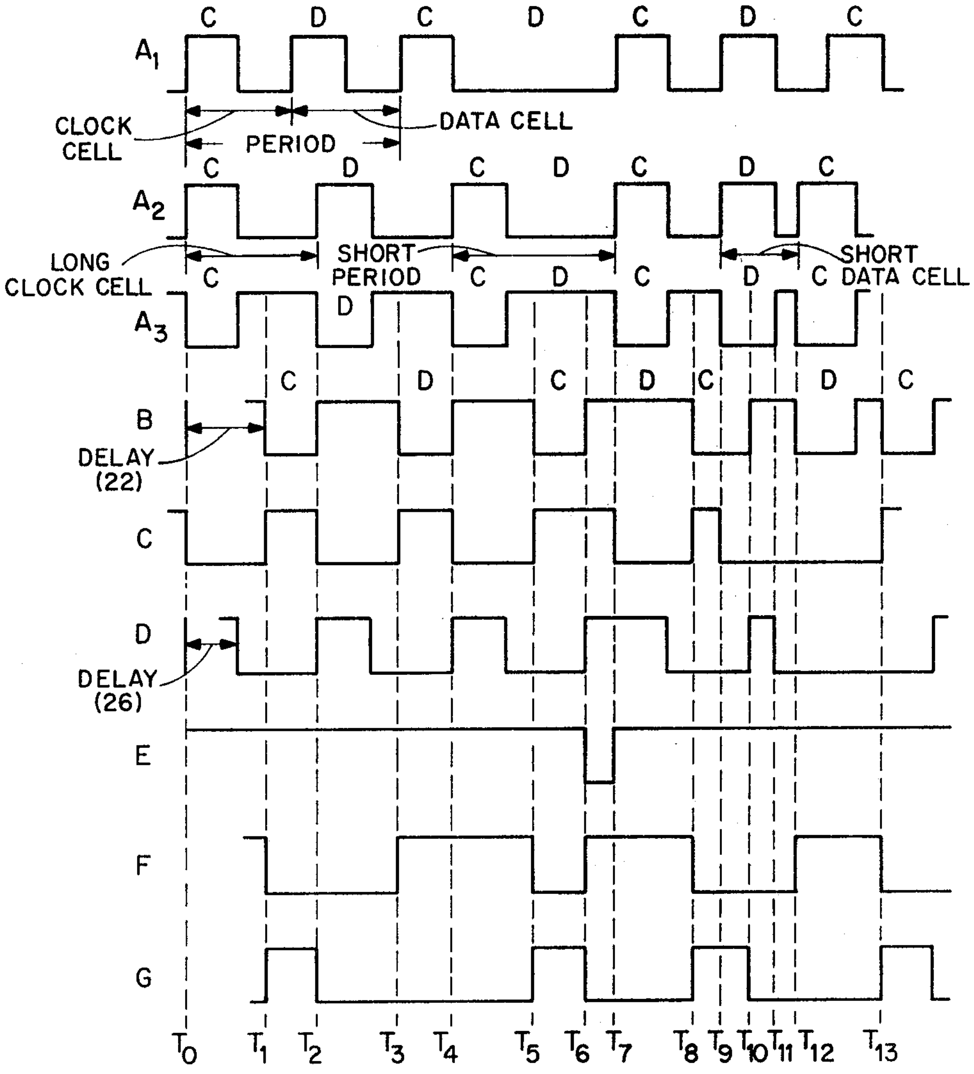
FIG. 3 is a timing diagram illustrating the waveforms of the diagram in FIG. 1.

The information detecting circuit of FIG. 1 is adapted for use with double frequency recorded information and is best understood by reference to the timing waveforms shown in FIG. 3. Waveform $A_1$ illustrates an ideal double frequency stream of information bits as recovered from a magnetic medium. As can be seen the clock bits are usually present whereas data bits representative of a first binary number are present and data bits representative of a second binary number are absent. A clock bit is contained in a clock cell whereas a data bit is contained in a data cell. The clock cell precedes the data cell and both cells combine to make a full period. It should be noted that for synchronizing purposes, some recording systems omit a clock bit at a particular point on the magnetic medium. It can be seen that this omitted clock bit may also be sensed by the circuit of FIG. 1.

Waveform $A_2$ represents the typical double frequency stream of information bits. Between times $T_0$ and $T_2$ a long clock cell is illustrated, that is, the data bit is late in arrival or the clock bit could have been early in arrival. A short data cell is illustrated between times $T_9$ and $T_{12}$. In this example the clock bit is early in arrival. A short period is illustrated between times $T_4$ and $T_7$, wherein a data bit is absent and the clock bits have moved toward each other. Waveform $A_3$ is simply an inversion of waveform $A_2$ and further discussion of the circuit in FIG. 1 will be made with reference to waveform $A_3$.

The delay times of delays 22 and 26 are set in accordance with specifications as to the shortest possible cell time, the shortest possible period and the longest possible cell time. Accordingly, the delay 22 is set so that the time delay between input terminal 16 and the output of flip-flop 24 is less than the shortest possible cell time. This method accommodates for the circuit delay of flip-flop 24. Delay 26 is set to have a time delay which is slightly less than the delay time of the delay 22. In addition, for further improved operation the total sum of the delay times of delays 22 and 26 as well as any delay produced by flip-flop 24 should be less than the shortest possible period and should be greater than the longest possible cell time. The duration of the clock and data bits may vary but the above-mentioned timing considerations must be complied with.

In operation therefore, and with reference to the circuit of FIG. 1 and the timing waveforms of FIG. 3, the operation of the information detecting apparatus of the invention will now be discussed. Input waveform $A_3$ which is received at terminal 16 is delayed to produce a waveform B starting at time $T_1$. The delay produced by delay 22 between times $T_0$ and $T_1$ is the same as or slightly less than the shortest cell time as shown in this example between times $T_9$ and $T_{12}$. Waveforms A and B therefore, are applied to the DC Reset and toggle inputs respectively of flip-flop 24 producing waveform C which is a stream of pulses the width of which pulses is dependent on such delay of delay 22 and the time between successive bits of waveform $A_3$. A positive to negative transition is produced in waveform C when waveform $A_3$ also goes from a positive to negative value. Waveform B will toggle the flip-flop 24 when waveform B changes from a positive to a negative value except when waveform $A_3$ is in the negative state. Thus, waveform $A_3$ produces a positive to negative transition in waveform C at times $T_0$, $T_2$, $T_4$, $T_7$, and $T_9$. Waveform B provides the toggling action at times $T_1$, $T_3$, $T_5$, $T_8$ and $T_{13}$. Waveform B did not provide this toggling action at time $T_{12}$ because waveform $A_3$ was or was simultaneously going into the negative state. Thus the width of the pulses of waveform C are varied and are dependent upon the aforementioned conditions. It should be noticed at this time that the DC Reset override feature of the flip-flop 24 in circuit 10 accepts and operates on an incoming stream of information bits which have large cell and period variations.

Waveform C which is a stream of pulses having varying widths is delayed by delay 26 by a time which is slightly less than the delay produced by delay 22. This delayed waveform is shown as waveform D. Both waveforms C and D are applied to the inputs of gate 28 to provide an output waveform E at terminal 18 when both waveforms C and D are in the positive state. Such condition occurs between times $T_6$ and $T_7$ and accordingly such pulse shown in waveform E is indicative of a missing data bit generally indicated in waveform $A_3$ between times $T_5$ and $T_6$. Thus an output signal, that is, the negative pulse of waveform E is produced when the pulses of waveform C are greater than a selected value. Thus, the widest pulse of waveform C, in this example between times $T_5$ and $T_7$ has produced the output signal. It should be evident that had the delay time of delay 26 been greater than the delay of delay time 22, causing waveform D to start at time $T_1$ for example, then at least one erroneous output pulse would have occurred starting at time $T_1$ of waveform E. It should also be evident that if it were not for the override capability of flip-flop 24, a negative to positive transition might have occurred at waveform C at time $T_{12}$ thereby causing an erroneous output pulse to appear on waveform E ending at time $T_{13}$. Other problems would have been encountered if for example the total delay time of delays 22 and 26 were not less than the shortest possible period and greater than the longest possible cell time.

The purpose of circuit 14 is to extract clock bits which have been alternated with the data bits. The presence of a negative pulse on waveform E between successive clock pulses on waveform G will indicate a data bit having a second binary value, that is, a binary zero, whereas the absence of a negative pulse on waveform E between successive clock pulses on waveform G would indicate that a data bit having a first binary value or a binary one were present. As was the case for flip-flop 24, waveform B will toggle flip-flop 30, whereas waveform E, which is the output signal, will provide an override on the DC Set input of flip-flop 30. Thus waveform E will cause the output waveform F of flip-flop 30 to change from a negative to a positive state in our example at time $T_6$, whereas the waveform B will cause flip-flop 30 to change state in a toggling action in our example at times $T_1$, $T_3$, $T_5$, $T_8$, $T_{12}$ and $T_{13}$ producing the pulses of waveform F. The pulses of waveform G will be produced when the polarities of waveform F and waveform B are both negative. The clock pulses are therefore produced beginning at times $T_1$, $T_5$, $T_8$ and $T_{13}$ and may be utilized in addition for shifting such information into receiving registers not shown.

Figure 2:
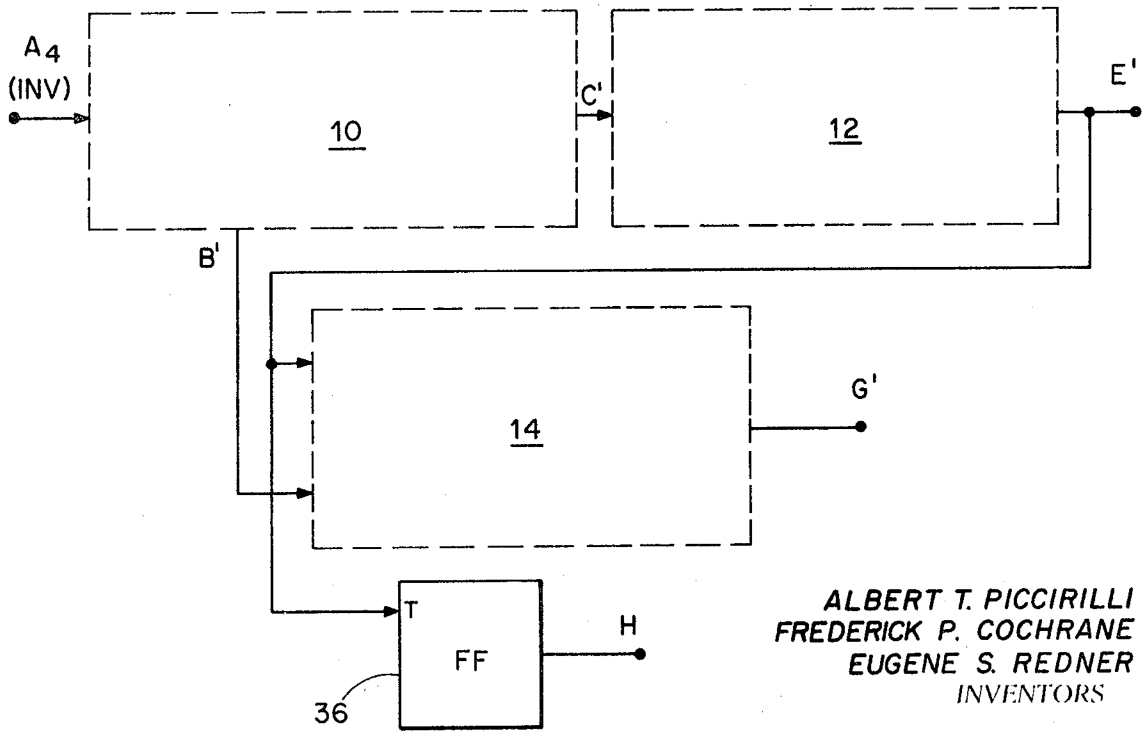
FIG. 2 is a schematic block diagram illustrating information detecting apparatus utilized with phase encoded techniques.
Figure 4:
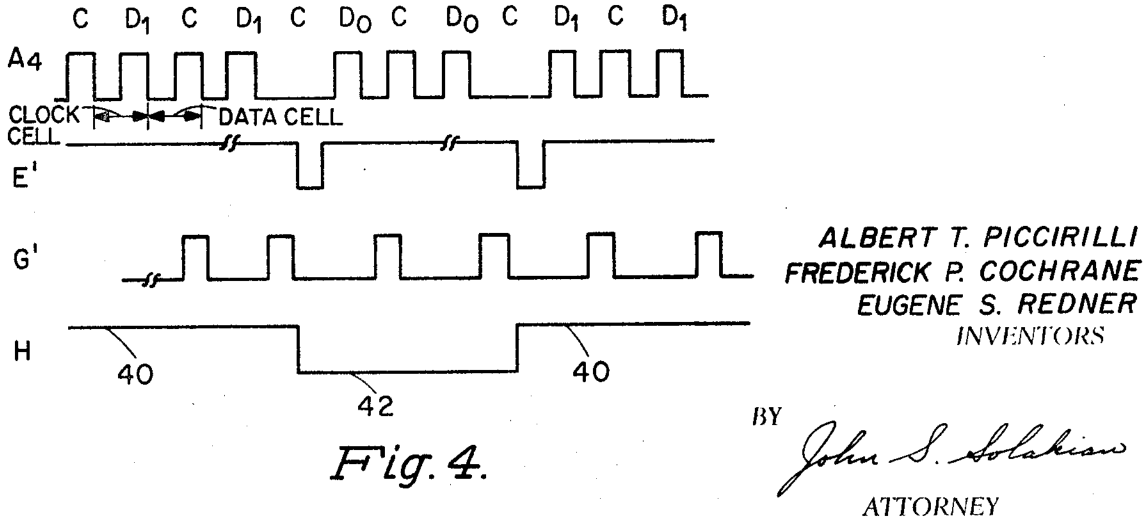
FIG. 4 is a timing diagram illustrating the waveforms of the diagram in FIG. 2.

The above description has been for double frequency encoded information. Identical apparatus to FIG. 1 may be used for detecting information recorded with phase encoding techniques. The addition of a bistable indicating means 36 to the circuit of FIG. 1 is necessary however, and is shown in FIG. 2. Now referring to FIG. 2 and FIG. 4 operation will be discussed with reference to phase encoded information. Such phase encoded information appears as waveform $A_4$ in FIG. 4, the inverted waveform of which is applied to the input of circuit 10. As can be seen, the absence of a clock bit changes the binary number indication of the following data bits. The output of circuit 12 now indicates a missing clock bit as shown by waveform E'. The output of circuit 14 will now indicate data bits as shown by waveform G'. The state of waveform H at the output of bistable indicating means 36 will determine whether the data bits of waveform G' are indicative of the first or second binary number. Bistable means 36 may be a flip-flop and includes a toggle input and must be initialized by such means as a clock bit so that the output indication will not be opposite from that desired. The positive to negative transition of waveform E' will cause flip-flop 36 to toggle between states 40 and 42. Data bits of waveform E' occurring when waveform H is in state 40 will be indicative of a binary one whereas data bits occurring during the time waveform H is in state 42 will be indicative of a binary zero. In addition, the data bits of waveform G' may be used as shifting pulses as were the clock pulses of waveform G in FIG. 3.

The invention has been particularly shown and described with reference to preferred embodiments, however, modification and variations of the invention are possible in the light of the above teachings. It is therefore understood that within the scope of the appended claims the invention may be practiced otherwise than specifically described.

Having now described the invention, what is claimed as new and novel and for which it is desired to secure Letters Patent is:

1. Information detecting apparatus, comprising:

A. pulse generating means, having an input and an output, coupled to receive a stream of information bits at said input, having a first delay time between said input and said output and generating at said output from said stream of information bits a stream of pulses whose width is dependent on said first delay time and the time between successive ones of said information bits; and B. means, coupled to said output, for producing from said stream of pulses an output signal representative of a missing one of said bits when the width of a pulse of said stream of pulses is greater than a selected value.

2. Apparatus as defined in claim 1 wherein said stream of information bits includes alternate clock and data bits and wherein said first delay time is less than the minimum possible time between corresponding points of said clock and data bits.

3. Apparatus as defined in claim 2 wherein said means for producing is a low pass digital filter.

4. Apparatus as defined in claim 3 wherein said filter comprises:

A. second delay means having a second delay time which is less than said first delay time, said second delay means coupled to receive said stream of pulses and producing a delayed stream of pulses; and B. gate means coupled to produce an output signal when said stream of pulses and said delayed stream of pulses are in a selected state.

5. Apparatus as defined in claim 4 wherein said first delay time and said second delay time include a total delay time which is less than the shortest possible time between corresponding points of like bits and which is greater than the longest possible time between corresponding points of said clock and data bits.

6. Apparatus as defined in claim 1 wherein said pulse generating means further comprises a first delay means and a bistable means, the combination of which produces said first delay time, said first delay means coupled to receive said stream of information bits and said first delay means generating a delayed stream of information bits, said bistable means coupled to receive both said stream and said delayed stream of information bits, said bistable means producing a first state at said output when a selected transition of any one of said stream of information bits is received and producing a second state at said output when a selected transition of any one of said delayed stream of information bits is produced at the output of said first delay means.

7. Apparatus as defined in claim 6 wherein said output remains in said first state when said stream of information bits is in said first state.

8. Apparatus as defined in claim 6 wherein said stream of information bits includes alternate clock and data bits, the presence of a data bit representing a first binary number and the absence of a data bit representing a second binary number, wherein said output signal is representative of said second binary number, wherein said apparatus is of the type used to detect double frequency encoded information, and wherein said apparatus further comprises means for separating said clock bits from said data bits while maintaining a selected phase relationship with said output signal.

9. Apparatus as defined in claim 8 wherein said means for separating comprises:

A. second bistable means coupled to receive said output signal and said delayed stream of information bits, said second bistable means producing a waveform toggled between first and second states when a selected transition of any one of said delayed stream of information bits is received, and producing a second state of said waveform when a selected transition of said output signal is received; and B. gate means coupled to produce an output clock bit when said delayed stream of information bits and said waveform are in a selected state.

10. Apparatus as defined in claim 2 wherein said apparatus is of the type used to detect phase encoded information, wherein said output signal is representative of a missing clock bit, wherein data bits representative of a first binary number and data bits representative of a second binary number are grouped alternately between successive missing clock bits, and wherein said apparatus further comprises means for indicating the binary number of said data bits, said means for indicating comprising first bistable means having an output and an input coupled to receive said output signal, said output signal toggling the output of said first bistable means between first and second states thereby indicating the presence of data bits representative of first and second binary numbers respectively.

11. Apparatus as defined in claim 10 further comprising means for separating said data bits from said clock bits while maintaining a selected phase relationship with said output signal representative of missing clock bits, said means for separating comprising:

A. second bistable means coupled to receive said output signal and a delayed stream of information bits from said pulse generating means, said second bistable means producing a waveform toggled between first and second states when a selected transition of any one of said delayed stream of information bits is received and producing a second state of said waveform when a selected transition of said output signal is received; and B. gate means coupled to produce an output data bit when said delayed stream of information bits and said waveform are in a selected state.

12. Information detecting apparatus coupled to receive a stream of information bits which include alternate data bits and clock bits, said apparatus comprising:

A. first delay means for delaying said stream of information bits by a time which is less than the minimum possible time between corresponding points of said data and clock bits;

B. first bistable means coupled to produce a first state of a waveform when a first transition of any one of said stream of information bits is received and coupled to produce a second state of said waveform when a first transition of any one of said delayed stream of information bits is received;

C. second delay means for delaying said waveform by a time which is less than the delay time of said first delay means; and D. gate means coupled to produce a signal indicative of a missing bit of said stream of information bits when said waveform and said delayed waveform are in a selected state.

13. Apparatus as defined in claim 12 wherein said first bistable means remains in said first state when said stream of information bits is in said first state.

14. Apparatus as defined in claim 12 wherein said first bistable means includes a J-K flip-flop.

15. Apparatus as defined in claim 12 wherein said first and second delay means include a total delay time which is less than the shortest possible time between corresponding points of like bits.

16. Apparatus as defined in claim 15 wherein said first and second delay means include a total delay which is greater than the largest possible time between corresponding points of said clock and data bits.

17. Information detecting apparatus for double frequency recorded binary signals which include a clock cell preceding a data cell in each period, said clock cell including a clock bit and said data cell including a data bit which is representative of a first binary signal and including a data bit which is representative of a second binary signal, said apparatus comprising:

A. first delay means having a first delay time for delaying said recorded binary signals;

B. pulse generating means coupled to generate a stream of pulses from said recorded binary signals and said delayed recorded binary signals, the width of each of said pulses dependent on said first delay time and the time between successive ones of said clock and data bits;

C. second delay means having a second delay time for delaying said stream of pulses; and D. gate means coupled to produce an output signal indicative of a missing data bit of said recorded binary signals when said stream of pulses and said delayed stream of pulses are of a selected like state.

18. Apparatus as defined in claim 17 wherein:

A. said first delay time is no greater than the shortest possible cell time;

B. said second delay time is less than said first delay time; and

C. the sum of said first and second delay times is less than the shortest possible period and greater than the longest possible cell time.

19. Apparatus as defined in claim 18 wherein said first and second delay means are alterable in accordance with the rate of said recorded binary signals.

20. Apparatus as defined in claim 18 wherein said pulse generating means comprises a bistable means having a toggle input, a reset input and an output, said toggle input connected to receive said delayed recorded binary signals and said reset input connected to receive said recorded binary signal, said bistable means generating a first state of said stream of pulses at said output when a first transition of said clock or data bit is received at said reset input and generating a second state of said stream of pulses at said output when said first transition of said clock or data bits is received at said toggle input and when said recorded binary signals received at said reset input are in said second state.

* * * * *